April 7, 1959 D. E. HEATH Re. 24,628
ICE MAKING MACHINE
Original Filed Dec. 12, 1952 3 Sheets-Sheet 1
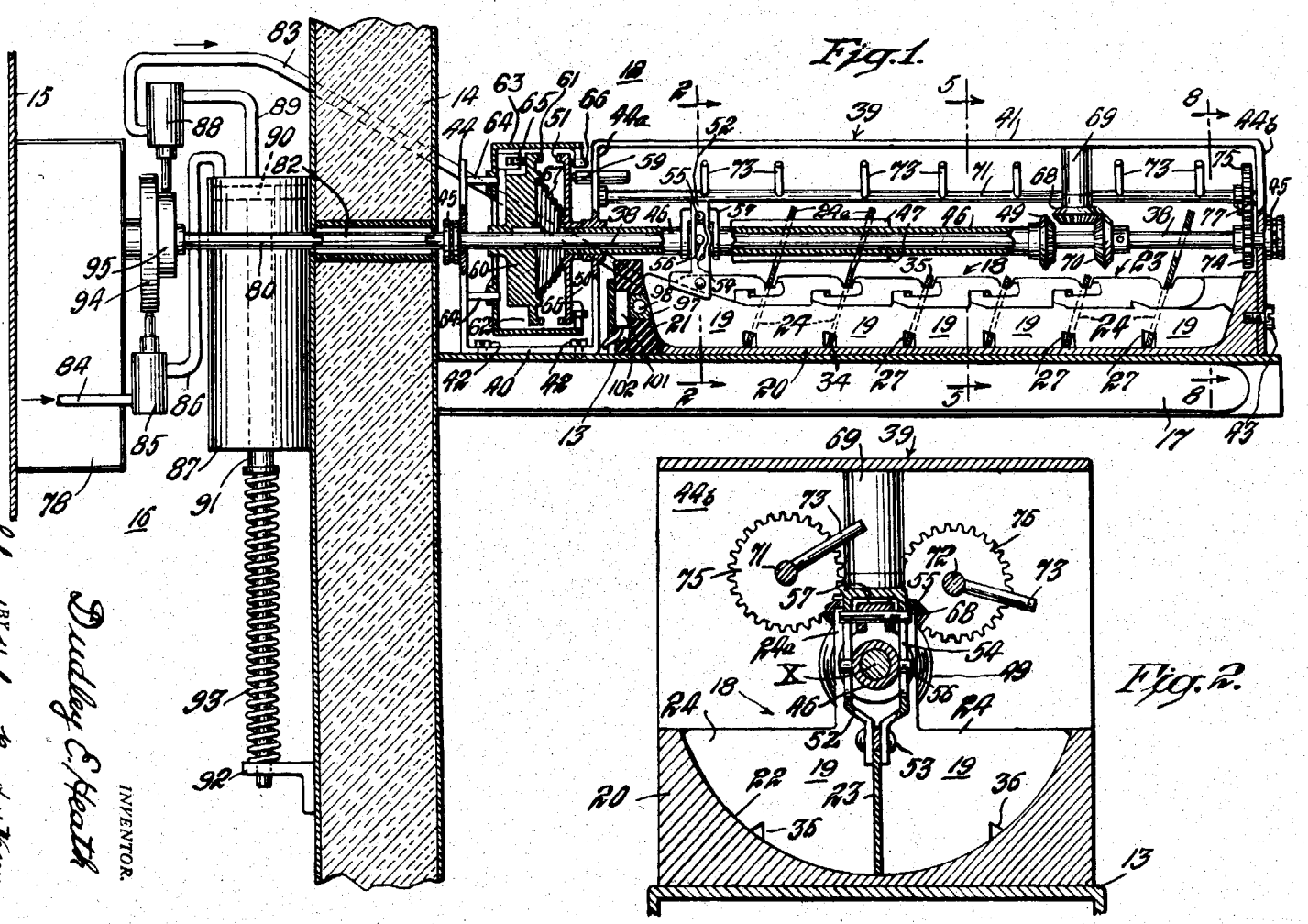
INVENTOR.
Dudley E. Heath
BY Schroeder, Hofgren, Brady & Wegner
ATTORNEYS

ICE MAKING MACHINE

Original Filed Dec. 12, 1952 3 Sheets-Sheet 2

INVENTOR.

Dudley E. Heath

BY Schroeder, Hofgren, Brady + Wegner ATTORNEYS

ICE MAKING MACHINE
Original Filed Dec. 12, 1952 3 Sheets-Sheet 3
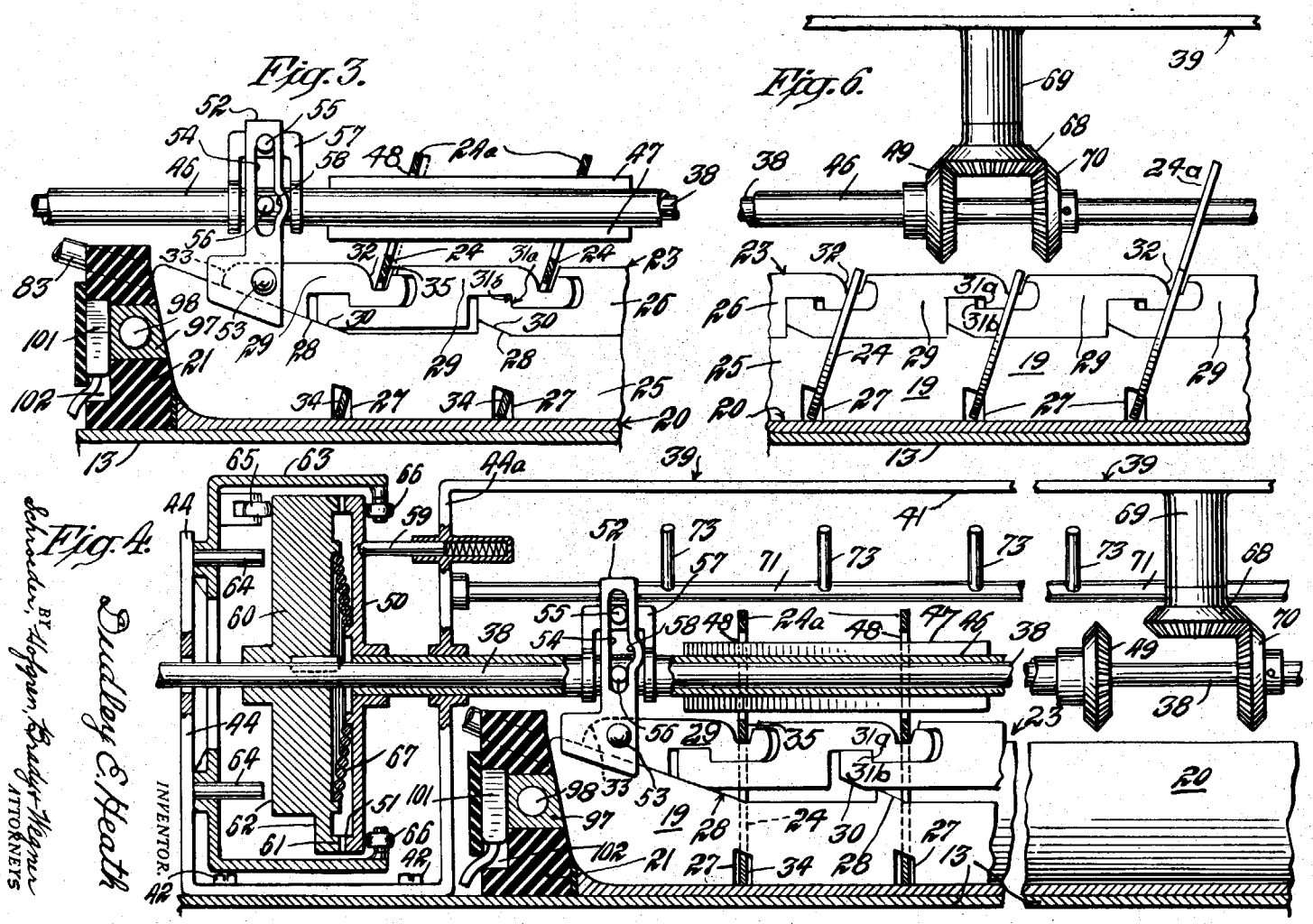

United States Patent Office

Re. 24,628
Reissued Apr. 7, 1959

24,628

ICE MAKING MACHINE

Dudley E. Heath, Evansville, Ind., assignor, by mesne assignments, to Whirlpool Corporation, a corporation of Delaware Original No. 2,840,507, dated June 24, 1958, Serial No. 325,552, December 12, 1952. Application for reissue November 3, 1958, Serial No. 771,938

19 Claims. (Cl. 62—135)

Matter enclosed in heavy brackets [ ] appears in the original patent but forms no part of this reissue specification; matter printed in italics indicates the additions made by reissue.

The present invention relates to improvements in ice making machines and more particularly to an automatic ice maker for a domestic refrigerator.

One of the objects of the present invention is to provide an icemaking machine for use in a domestic refrigerator which first mechanically loosens ice pieces in a mold in which they are frozen and then removes the ice pieces from the mold in a dry state without any loss of refrigeration capacity.

Another object is to provide an ice making machine of the type indicated which operates to progressively move the walls of an ice mold for loosening the individual ice pieces therein and thereafter sweep the loosened ice pieces from the mold.

Another object is to provide an ice making machine of the type indicated which operates to positively eject and transfer the ice pieces away from the mold.

Still another object is to provide an ice making machine of the type indicated which is entirely automatic in operation to supply a measured quantity of water or other liquid to an ice freezing mold and remove ice from the mold in repeated cycles as governed by a control.

These and other objects will become more apparent from the following description and drawings in which like reference characters denote like parts throughout the several views. It is to be expressly understood, however, that the drawings are for the purpose of illustration only, and not a definition of the limits of the invention, reference being had for this purpose to the appended claims. In the drawings:

Fig. 1 is a longitudinal sectional view of an ice maker incorporating the novel features of the present invention and showing the ice freezing mold and ice harvesting mechanism for loosening and removing ice pieces therefrom;

Fig. 2 is a transverse sectional view on line 2—2 of Fig. 1 showing the arcuate bottom wall of the ice mold and the relationship of the parts of the harvesting mechanism;

Fig. 3 is an enlarged sectional view showing the construction of the partition walls in the mold and the longitudinally movable sleeve of the harvesting mechanism for progressively moving the partition walls;

Fig. 4 is a view similar to Fig. 3 showing the sleeve of the mechanism moved into clutching engagement with a power driven shaft for rotation therewith;

Fig. 6 is a sectional view showing the sleeve of the harvesting mechanism moved in the opposite direction to clutch it with a reversing gear;

Figure 5:
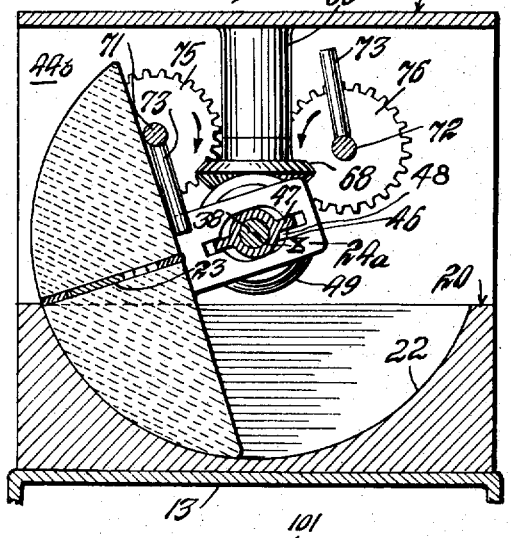
Fig. 5 is a view taken on line 5—5 of Fig. 1 and showing the partition walls of the mold rocked clockwise by the power driven shaft to sweep ice pieces from one side thereof and ejecting fingers moving into engagement with the ice pieces.

In the drawings, an ice machine incorporating the novel features of the present invention is shown in the low temperature freezing compartment 12 of a domestic refrigerator having a refrigerated wall 13. The compartment 12 has a rear wall 14 of insulating material, and a wall 15 at the rear of the insulated wall provides a flue space 16 therebetween. Wall 13 may be refrigerated by the evaporator 17 of any suitable type of mechanical refrigerating apparatus, not shown, operating on either the compression or absorption principle, and a portion of an evaporator coil is shown in thermal contact with the wall. It will be understood that the condenser and absorber, when an absorption refrigeration is used, are located in the flue 16 and cooled by air circulating through the flue by thermo-syphon action.

In its broadest aspect the ice maker of the present invention comprises an ice mold 18 fixed in thermal contact with a refrigerated surface 13 and having movable walls forming individual cells 19. A liquid supply means delivers a measured quantity of liquid to the mold where it is frozen into ice pieces in the individual cells 19. Harvesting mechanism is connected to progressively move the walls of the mold 18 to mechanically loosen the ice pieces in the cells and thereafter sweep the dry, loosened ice first from one side and then from the opposite side of the mold. Ejecting members actuated in timed relation to other elements of the harvesting mechanism positively propel loosened ice pieces away from the mold. A power driven element is connected to operate the liquid supply means and ice harvesting mechanism in the proper timed sequence as controlled by a thermostat responsive to the formation of ice in the mold to supply liquid and remove ice in repeated cycles.

In the illustrated embodiment, the mold 18 comprises a tray 20 fixedly attached to the refrigerated bottom wall 13 of freezing compartment 12 by any suitable means such as screws, bolts or the like. The tray 20 may be of any suitable construction and is illustrated in the form of a metal casting forming one end, side and bottom walls to provide good thermal contact with the refrigerated surface 13 and having one end wall 21 of insulating material to reduce the rate of heat transfer from the cells 19 adjacent thereto. As illustrated in Fig. 2, the bottom wall 22 of the tray is of arcuate or cylindrical contour having a radius at the axis X.

The interior of the tray 20 is divided into two rows of individual cells 19 by a longitudinal partition wall 23 and a plurality of transverse partition walls 24. The partition walls 23 and 24 are articulated for relative movement, and, as illustrated, constitute a grid bodily movable as a unit relative to the tray 20. While one form of mold 18 having articulated partition walls 23 and 24 is illustrated in the drawings to provide for progressive actuation of the walls, it will be understood that other flexible walled mold constructions may be used. As illustrated most clearly in Figs. 3 and 4, the longitudinal partition wall 23 comprises lower and upper sections 25 and 26, respectively. Lower section 25 has notched grooves 27 in its lower edge and inclined cam surfaces 28 at its upper edge. The upper section 26 comprises a plurality of interlocking members 29 each having an inclined cam surface 30 for cooperation with an inclined cam surface 28 of the lower section 25 and shoulders 31a and 31b. Shoulder 31a on each member 29 is spaced from shoulder 31b on the next adjacent member so that each member may move longitudinally relative to the next adjacent member until the shoulders interlock to cause progressive movement of successive members. Each member 29 also is provided with a recess or notch 32 in its upper edge. The endmost member 29 is of slightly different shape from the other members to provide a lug or tab 33 for connection to a longitudinally movable actuating member, later to be described.

The transverse partition walls 24 of the grid are movable relative to each other and the longitudinal partition wall 23. As viewed in Fig. 2, the bottom edges of the transverse partition walls 24 are of arcuate shape to conform to the contour of the arcuate bottom wall 22 of the mold. Each transverse wall embraces the longitudinal wall with a tongue 34 in one of the grooves 27 in the lower section 25 and a tongue 35 in the recess 32 at the top of the interlocking members 29 overlying the particular groove. Thus, longitudinal movement of the first interlocking member 29 at the lefthand end as viewed in Fig. 1 causes rocking movement of the first transverse partition wall 24 from the dotted line to the full line position illustrated in Fig. 3 until the shoulder 31a has moved into engagement with the shoulder 31b of the next adjacent member which then, in turn, rocks the next adjacent transverse partition wall, and so on from one end of the grid to the other. It is therefore apparent that longitudinal movement of the first interlocking member 29 of the longitudinal partition wall 23 will progressively move the transverse partition walls 24 in succession, the interlocking members 29 of the upper section 26 will move relative to each other, and the upper section will move relative to the lower section 25 of the longitudinal wall 23. Small notches 36 are provided in the edge of each transverse partition wall 24 at opposite sides thereof to permit water to flow to successive cells 19.

The ice harvesting mechanism for moving the longitudinal and transverse walls 23 and 24 of the grid to loosen ice pieces frozen in the tray 20 and thereafter sweep the loosened ice pieces from the tray comprises a shaft 38 mounted to rotate in a frame 39. Frame 39 is illustrated in the form of a metal plate bent to provide a U-shaped portion 40 at one end of tray 20 and an inverted U-shaped portion 41 overlying the tray, see Fig. 1. The depending loop of the U-shaped portion 40 is rigidly attached to the refrigerated surface 13 by means of screws 42, and the outer leg of the inverted U-shaped portion 14 is attached to the end wall of the tray 20 by means of screws 43. Shaft 38 extends through the walls 44, 44a and 44b of the frame 39 at the longitudinal axis X of the arcuate bottom wall 22 of the tray 20. The opposite ends of the shaft 38 are journaled in antifriction thrust bearings 45 on the end walls 44 and 44b to prevent any longitudinal movement of the shaft. A sleeve 46 is mounted on shaft 38 for longitudinal and rotary movement relative thereto and several of the transverse partition walls 24 of the grid have extensions 24a embracing the sleeve 46, see Figs. 2, 5 and 7. Upper and lower splines 47 on the sleeve 46 interlock with the sides of slotted openings 48 in the extensions 24a but the slotted openings loosely fit the sleeve and splines to permit rocking movement of the transverse walls 24 while providing a driving connection for rotating the grid as a unit. A bevel gear 49 is mounted fast on the righthand end of the sleeve 46 as viewed in Fig. 1, and a circular plate 50 is mounted fast on the lefthand end of the sleeve and has clutch teeth 51 on one side thereof.

Sleeve 46 is connected to the lug or tab 33 on the endmost member 29 of the mold partition wall 23 by means of a yoke 52 embracing the sleeve and member. The lower ends of the arms of the yoke 52 are pivotally connected to the lug or tab 33 of the interlocking member 29 by a pin 53, see Fig. 2, and the arms have slots 54 embracing pins 55 and 56 projecting from opposite sides of the sleeve and a bracket 57 supported by the sleeve. The slots 54 have recesses 58 to permit a slight relative movement of the sleeve 46 and yoke 52 to the right as viewed in Fig. 3.

The sleeve 46 is slid longitudinally of shaft 38 from the position shown in Fig. 1 to that shown in Fig. 4 by a cam plate 60 to progressively actuate the transverse walls 24 of the mold to loosen ice pieces therein and thereafter connect the sleeve to the shaft for rotation therewith to the position illustrated in Fig. 5. Cam plate 60 is mounted fast on the shaft 38 beyond the circular plate 50 of sleeve 46 and has clutch teeth 61 on one side for engagement with the clutch teeth 51 and a cam race 62 on the other side. Enclosing the plates 50 and 60 is an annular cage 63 mounted for sliding movement on pins 64 projecting from the wall 44 of the frame 39. The annular cage 63 is preferably made in two parts bolted together and has a cam follower 65 adapted to bear against a cam surface in the cam race 62. Bearing rollers 66 at the opposite side of the cage 63 bear against the plate 50. A helical spring 67 is positioned between the adjacent faces of the cam plate 60 and plate 50 to hold the respective plates in engagement with the cam follower 65 and bearing rollers 66, respectively. The cam race 62 on the cam plate 60 is projected in Fig. 9 to show the rise and fall of the cam surface relative to the cam follower 65 for successive increments of angular rotation of the cam plate 50. Preferably, a yielding detent 59 mounted on the upright wall 44a of the frame 39 cooperates with notches in the side of the circular plate 50 to yieldingly hold the sleeve 46 in each of several angular positions.

Figure 7:
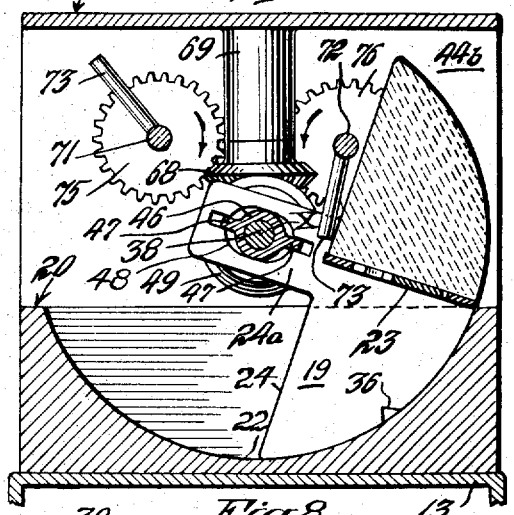
Fig. 7 is a view similar to Fig. 5 showing the partition walls of the mold rocked counterclockwise by the reversing gear to sweep ice pieces from the opposite side of the mold.

The sleeve 46 is slid longitudinally of shaft 38 by spring 67 as controlled by the surfaces of the cam race 62 from the position shown in Fig. 4 to that shown in Fig. 6 to engage the bevel gear 49 at its end with the intermediate bevel gear 68 of a reversing mechanism to rotate the grid counterclockwise from the position shown in Fig. 5 to that shown in Fig. 7. The reversing mechanism comprises the intermediate bevel gear 68 mounted to rotate freely on a stub shaft 69 depending from the top wall of the frame 39 and a bevel gear 70 fast on the shaft 38 and meshing with the intermediate gear.

Figure 8:
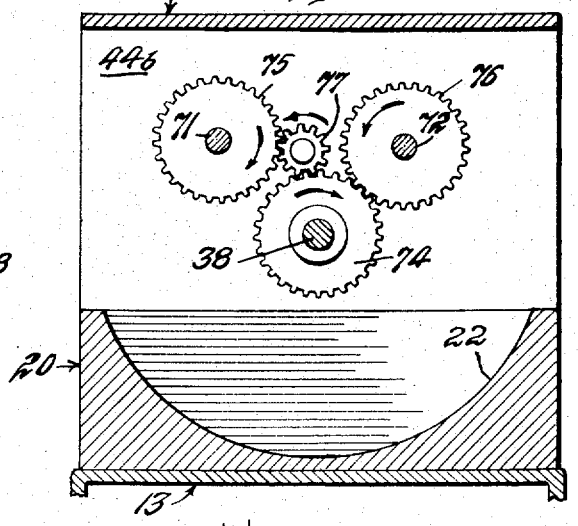
Fig. 8 is a sectional view taken on line 8—8 of Fig. 1 showing the gear train for rotating the shafts of the ejecting mechanism in timed relation with the rocking of the partition walls.

The ejecting means comprises parallel shafts 71 and 72 at opposite sides and above the drive shaft 38. The opposite ends of the shafts 71 and 72, see Figs. 1 and 2, are journaled in the upright walls 44a and 44b of frame 39 and have a number of radal fingers 73 projecting from one side thereof corresponding to the number of the cells 19 on one side of the grid. The shafts 71 and 72 are driven in timed relation with the shaft 38 by means of gearing illustrated in Fig. 8. The gearing consists of a spur gear 74 mounted on the drive shaft 38 adjacent the righthand side of the frame as viewed in Fig. 1 and spur gears 75 and 76 mounted on shafts 71 and 72. Spur gear 74 meshes with spur gear 76 mounted on shaft 72 and an intermediate spur gear 77 meshing with the spur gears 74 and 75 to rotate shafts 71 and 72 in the directions shown by the arrows.

The harvesting mechanism for loosening ice pieces in the mold 18 and removing the loosened ice pieces therefrom is actuated by a power driven element or prime mover 78. In the illustrated embodiment the power driven element 78 is located in the flue 16 at the rear of the low temperature freezing compartment 12 and is shown in the form of an electric motor having a reduction gear train in a self-contained unit. Motor 78 is of a well known type adapted to rotate a drive shaft 80 through one complete revolution, and has an electric switch 81, see Fig. 10, operated by a cam on the shaft for opening the motor circuit at the completion of a revolution. Preferably, the drive shaft 80 is connected to the driven shaft 38 through an intermediate shaft 82 of a suitable insulating material to reduce heat conduction from the low temperature freezing chamber 12.

Liquid to be frozen is automatically supplied to the mold 18 to begin an ice freezing cycle. As illustrated, the liquid supplying means comprises a conduit 83 having one end projecting through the end wall 21 of mold 18 and upwardly through the insulated wall 14 of compartment 12 into the flue 16. Liquid, such as water, is supplied under pressure from any suitable source such as the city water main through a pipe 84 connected to an inlet control valve 85. An intermediate conduit 86 connects valve 85 to a measuring cylinder 87 and the cylinder, in turn, is connected to an outlet valve 88 by a conduit 89. Outlet valve 88 is connected to the end of supply conduit 83. The cylinder 87 is shown mounted on the rearward side of the insulating wall 15, and has a piston 90 therein indicated by dotted lines in Fig. 1, with a piston rod 91 mounted for movement in a bracket 92 against the action of a spring 93. The cylinder 87 is shown with a relatively small diameter for the purpose of illustrating the path of liquid flow but it will be understood that the cylinder will have a larger diameter to reduce the stroke of the piston 90. Each of the valves 85 and 88 has an actuating plunger engaging the periphery of a cam 94 or 95 on the drive shaft 80 of the power driven unit 78. Although not shown, cams 94 and 95 have lobes arranged to first close outlet valve 88 upon initial rotation of drive shaft 80, then open the inlet valve 85, next close the inlet valve and then open the outlet valve during one complete revolution of the drive shaft.

A suitable thermostat 96 is provided for controlling operation of the ice maker. As illustrated, thermostat 96 comprises a metal conducting insert 97, see Fig. 4, in the insulating material of the end wall 21 of the mold 18 which is in direct contact with the contents of the mold. Extending through an opening in the metallic conducting member 97 is a bulb 98 containing a volatile fluid for producing a vapor pressure corresponding to the temperature of the metallic conducting element. Bulb 98 is connected to a bellows or diaphragm 99, shown only in Fig. 10, for actuating a switch 100. The arrangement of the thermostat is such that the bellows or diaphragm 99 normally maintains the switch 100 in open position but closes the switch at a predetermined low temperature corresponding to the freezing of the liquid into a solid ice mass in a cell 19 of the mold 18 adjacent the insulated end wall 21 which is the last to freeze. Preferably, a very low capacity heating element 101 is mounted in a recess 102 in the insulated end wall 21 of the mold 18 in contact with the conducting element 97. The purpose of the heating element 101 is merely to raise the temperature of the thermostatic bulb 98 during an ice harvesting cycle so that the operating mechanism will not repeat a harvesting cycle before sufficient water is supplied to the mold to increase the temperature of metallic insert 97.

Figure 10:
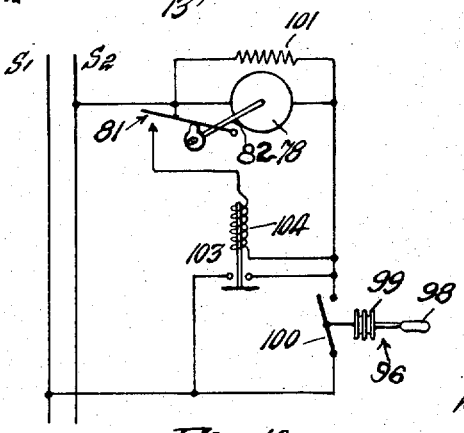
Fig. 10 is a diagrammatic view of the electric control circuit.

As illustrated in Fig. 10, thermostatic switch 100 is connected in an electric control circuit including the electric motor 78, heating element 101 and a holding switch 103. The heating element 101, motor 78 and a magnetic winding 104 of holding switch 103 are connected in parallel to one side of a power line $S_1$ and the thermostatic control switch 100 is connected in series with the elements to the other side of the line $S_2$ Holding switch 103 is connected in parallel with the thermostatic switch 100. Also, connected in series with the magnetic winding 104 of the holding switch 103 is the cam operated switch 81 actuated by the drive shaft 80 of the electric motor unit 78. Thus, closing of the thermostatic switch 100 energizes electric motor 78 and initial rotation of drive shaft 82 closes cam switch 81 to energize the winding 104 to close the holding switch 103 in parallel with the thermostatic switch 100. The motor will then continue to operate through one complete revolution regardless of the position of the thermostatic switch 100 and at the completion of one revolution of the drive shaft 82, cam switch 81, will open the circuit and stop the motor. Although not shown, a limit switch responsive to the amount of ice accumulated in the compartment 12 is preferably provided in the control circuit in series with the thermostatic switch 100. Such a limit control switch may be similar to that illustrated in a copending application of Sven W. E. Andersson Serial No. 205,519, filed Jan. 11, 1951, now Patent No. 2,717,495. One form of the invention having now been described in detail, the mode of operation is explained as follows:

For purposes of description, let it be assumed that liquid in the mold 18 has been frozen into ice pieces in the individual cells 19, that the parts are in the position illustrated in Fig. 1, and that the thermostat 96 has just closed the switch 100 in the control circuit, see Fig. 10. Closing of the switch 100 energizes the electric motor 78 and the heating element 101. Upon initial rotation of motor 78, the cam on the drive shaft 80 closes the cam switch 81 to energize winding 104 and close the holding switch 103. The heating element 101 of very low heating capacity merely operates to heat the bulb 98 of the thermostat 96 to insure that switch 100 will be open at the completion of an ice harvesting operation to prevent recycling.

Rotation of motor drive shaft 80 is transmitted through the intermediate shaft 82 to rotate the driven shaft 38 and the cam plate 60 mounted fast thereon. Cam follower 65 first rides on an ascending surface c, see Fig. 9, of the cam race 62, corresponding to rotation of shaft 38 through thirty degrees with the particular mold 18 and cam plate 60 illustrated, to move the cage 63 to the left as viewed in Fig. 1. The cage 63 slides on stationary pins 64 and, acting through bearing rollers 66, moves the circular plate 50 and sleeve 46 longitudinally of the shaft 38 from the position illustrated in Fig. 1 to that illustrated in Fig. 4. At the beginning of the inner movement of the sleeve 46, the yoke 52 moves the endmost member 29 of the upper grid section 26 to the position illustrated in Fig. 3. This initial movement rocks the first transverse partition wall 24 from the position illustrated in dotted lines to that illustrated in full lines to loosen the ice pieces in the first two cells 19 of the mold 18, after which shoulder 31a engages shoulder 31b on the next adjacent member 29. Subsequent longitudinal movement of the next adjacent member 29 rocks the next adjacent transverse partition wall 24 during which time the cam faces 30 on the members slide along the cooperating cam faces 28 of the lower section 25 to lift the members as they move longitudinally. Thus, the transverse partition walls 24 are progressively moved from one end of the mold to the other and the upper section 26 of longitudinal partition wall 23 is moved relative to lower section 25 to loosen the ice pieces in the individual cells 19.

At the end of the longitudinal movement of the sleeve 46 to the position illustrated in Fig. 4, the clutch teeth 51 on the circular plate 50 engage at the clutch teeth 61 on the cam plate 60. The cam follower 65 then rides along a flat portion d of the cam race 62, corresponding to seventy-three degrees of rotation of shaft 38, see Fig. 9, to hold the circular plate 50 clutched to the cam plate 60. During this rotation of shaft 38, sleeve 46 rotates clockwise with the shaft from the position illustrated in Fig. 2 to the position illustrated in Fig. 5 and, due to the connection of the splines with the extensions 24a of the transverse walls 24, rocks the grid clockwise to sweep the loosened ice pieces from one side of the mold 18. Simultaneously, shaft 71 of the ejecting means has been rotated through the gears 74, 77 and 75, see Fig. 8, and the fingers 73 are so located on the shaft as to come into engagement with the ice pieces at the end of the tilting movement of the grid.

Figure 9:
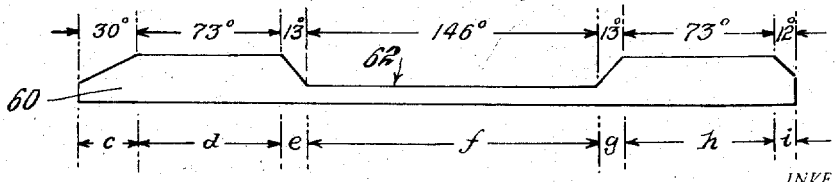
Fig. 9 is a projection of the surface of the cam for actuating the sleeve of the ice harvesting mechanism.

At the end of the rocking movement of the grid to the left as viewed in Fig. 5, the cam follower 65 rides onto a descending portion e of the cam race 62, see Fig. 9, corresponding to thirteen degrees of rotation of the cam plate 60 in the illustrated embodiment. During such rotary movement of the cam plate 60, the circular plate 60 and sleeve 46 are moved to the right by spring 67 to first disengage the clutch teeth 51 and 61 and engage bevel gear 49 with bevel gear 68 of the reversing mechanism. During such movement of sleeve 46, the grid is held in the position illustrated in Fig. 5 by the frictional engagement of ice with the bottom of the tray 20 and also by the spring detent 59 acting between the upright wall 44a of the frame 39 and recesses in the circular plate 50. Also, during such linear movement of the sleeve 46, the fingers 73 of the ejecting mechanism continue to move and positively displace the ice pieces from the cells 19 and at least move their outer ends over the side wall of the mold 18.

After the bevel gear 49 engages bevel gear 68 of the reversing mechanism, the cam follower 65 rides on a flat surface f in the cam race 62 corresponding to rotation of the cam plate 60 through one hundred and forty-six degrees. During this rotation of cam 60, sleeve 46 and grid connected thereto are rocked counterclockwise from the position illustrated in Fig. 5 to the position illustrated in Fig. 7. Also, during this rotation the fingers on shaft 71 have pushed the ice pieces from the lefthand side of the mold and fingers 73 on the shaft 72 will have moved to a position to engage and positively propel the loosened ice pieces from the righthand side of the mold 18.

At the end of the counterclockwise rocking movement of the grid to the right, the cam follower 65 rides up an ascending surface g on the cam race 62 corresponding to rotation of cam plate 60 through thirteen degrees to slide the sleeve 46 toward the left, disengage the bevel gear 49 from the bevel gear 68 of the reversing mechanism and again engage the clutch teeth 51 on the circular plate 50 with the clutch teeth 61 on the cam plate. Sleeve 46 and the grid connected thereto are then rotated clockwise with the shaft 38. The cam follower 65 then rides on flat portion h of the cam race 62 corresponding to rotation of cam plate 60 through seventy-three degrees to return the grid to its initial position. The cam follower 65 then rides on a descending surface i of the cam race 62 corresponding to rotation of cam plate 60 through twelve degrees to slide the sleeve 46 back to its initial position.

During a considerable portion of the movement of shaft 38 through one complete revolution, cam 94 holds the water valve 85 open to permit water under pressure from a city main, or the like, to enter measuring cylinder 87 and move the piston 90 downwardly against the action of the spring 93. Adjacent the end of one complete revolution of the drive shaft 80, the cam 94 closes water valve 85 and cam 95 opens valve 88. The spring 93 then moves the piston 90 upwardly in the cylinder 87 to force the measured quantity of water through the conduit 83 into the mold 18 to initiate the next ice freezing operation. The temperature of the water in the mold 18 acting through the insert 97 and bulb 98 of the thermostat 96, opens the switch 100 and holds it open until the next batch of ice has been frozen. At the completion of one complete revolution of the drive shaft 80, the cam switch 81 is opened to deenergize the magnetic winding 104 and thereby open the holding switch 103 of the control circuit, see Fig. 10, to stop operation of the ice harvesting mechanism. The ice maker continues to operate in the manner described to first supply water and then harvest ice in repeated cycles as governed by the control circuit.

While a single embodiment of the invention is herein illustrated and described, it will be understood that modifications may be made in the construction and arrangement of elements without departing from the spirit or scope of the invention. Therefore, without limitation in this respect, the invention is defined by the following claims.

I claim:

1. In an automatic ice making machine of the type in which liquid is frozen into ice in repeated cycles as governed by a control means operable responsive to a condition related to the formation of ice, a cooling element, an ice mold in heat exchange relation to the cooling element and having grid walls dividing the mold into individual cells, a plurality of said grid walls being constructed for progressive movement relative to each other and at least one wall being mounted for bodily movement, mechanism connected to progressively move the plurality of walls relative to each other to loosen the individual ice pieces frozen in the cells and thereafter bodily move said one wall to sweep the loosened ice pieces from the side of the mold, and power means connected for initiation by the control means and mechanically connected to actuate the mechanism.

2. In an automatic ice making machine of the type in which liquid is frozen into ice in repeated cycles as governed by a control means operable responsive to a condition related to the formation of ice, a cooling element, an ice mold having a longitudinal wall and a series of parallel transverse walls to form individual cells, ice release means connected to progressively move the series of transverse walls from one end of the mold to the other to loosen the individual ice pieces frozen in the cells, ice transfer means for moving at least one of the walls relative to other walls to sweep loosened ice pieces to the side of the mold, and power means connected for initiation by the control means and mechanically connected to actuate the ice releasing and ice transfer means successively.

3. In an automatic ice making machine of the type in which liquid is frozen into ice in repeated cycles as governed by a control means operable responsive to a condition related to the formation of ice, a cooling element, an ice mold fixed in heat exchange relation to the cooling element, said mold having a longitudinal wall and transverse walls mounted to rock on the longitudinal wall, actuating means connected to progressively rock the plurality of transverse walls, means for mounting the longitudinal wall to move transversely, mechanism connected to first operate the actuating means to progressively rock the transverse walls and loosen ice pieces frozen therebetween and thereafter move the longitudinal wall to sweep the loosened ice pieces to one side of the mold, and power means connected for initiation by the control means and mechanically connected to actuate the mechanism.

4. An ice making machine for automatically harvesting ice comprising a cooling element, an ice freezing mold fixed in heat exchange relation to the cooling element, said mold having an arcuate bottom wall and partition walls forming individual cells therein, said partition walls being movable and at least one of the walls being mounted to rock about the longitudinal axis of the arcuate bottom wall of the mold, harvesting mechanism connected to first progressively move the walls of the mold to loosen ice pieces frozen in the cells and thereafter rock said one wall to remove the loosened ice pieces from the mold, and a prime mover mechanically connected to operate the harvesting mechanism.

5. An ice making machine comprising a cooling element, a tray fixed in heat exchange relation to the cooling element for freezing liquid therein, said tray having an arcuate bottom wall, a grid in said tray having a longitudinal wall and transverse walls mounted to rock on the longitudinal wall, said grid being mounted for rocking movement about the longitudinal axis of the arcuate wall of the tray, a prime mover connected to progressively rock the transverse walls on the longitudinal wall to loosen ice pieces frozen therebetween and thereafter rock the grid relative to the tray to remove the loosened ice pieces from the tray, and means operated by the prime mover in timed relation with the movement of the grid for positively ejecting ice pieces from the grid.

6. An automatic ice making machine comprising a cooling element, a tray fixed in heat exchange relation to the cooling element for freezing liquid therein, said tray having an arcuate bottom wall, a grid in said tray having a longitudinal wall and transverse walls of arcuate shape to fit the bottom wall of the tray, said transverse walls being mounted for rocking movement relative to the longitudinal wall and about the longitudinal axis of the arcuate wall of the tray, power driven mechanism for rocking the transverse walls of the grid relative to the longitudinal wall to loosen the individual ice pieces and thereafter rock the grid relative to the tray to remove the loosened ice pieces, and a thermostat responsive to the formation of ice in the tray for initiating operation of the power driven mechanism.

7. An ice making machine comprising a cooling element, a tray fixed in heat exchange relation to the cooling element for freezing liquid therein, said tray having an arcuate bottom wall, a shaft overlying the tray at the axis of the arcuate bottom wall, a grid in the tray having a longitudinal partition wall and transverse partition walls mounted to rock on the longitudinal wall, certain of said transverse walls having extensions embracing the longitudinal shaft and connected for rotation therewith, and mechanism for rocking the transverse wall relative to the longitudinal wall to loosen the ice pieces frozen in the grid and rotating the shaft to rock the grid relative to the tray to remove the loosened ice pieces from the tray.

8. An automatic ice making machine comprising a cooling element, a tray fixed in heat exchange relation to the cooling element for freezing liquid therein, said tray having an arcuate bottom wall, a grid in said tray having a longitudinal wall and transverse walls mounted to rock on the longitudinal wall, a member movable longitudinally of the tray and connected to progressively rock the transverse walls relative to the longitudinal wall, a shaft at the axis of the arcuate wall of the tray and connected to certain of the transverse walls, power driven mechanism for actuating the movable member longitudinally of the tray to rock the transverse walls of the grid relative to the longitudinal wall and rotate the shaft to rock the grid relative to the tray, and control means operable responsive to a condition related to the formation of ice and connected to start and stop the power driven mechanism.

9. An ice making machine comprising a cooling element, an ice mold fixed in heat exchange relation to the cooling element, said mold having an arcuate bottom wall with cross walls forming individual cells and having at least one of said walls mounted to rock about the longitudinal axis of the arcuate bottom wall, harvesting mechanism connected to first move certain of the walls relative to each other to loosen ice pieces frozen in the cells and thereafter rock said one wall first in one direction to remove loosened ice pieces from one side of the mold and then in the opposite direction to remove the loosened ice from the opposite side of the tray, power means mechanically connected to operate the harvesting mechanism, and means movable between the cross walls forming the cells and operated by the power means in timed relation to the rocking of said one wall to positively eject ice pieces from said cells.

10. An ice making machine comprising a cooling element, a tray mounted in heat exchange relation to the cooling element for freezing liquid therein and having an arcuate bottom wall, a grid in said tray having a longitudinal wall and transverse walls movable relative to the longitudinal wall, a first means for moving the transverse walls of the grid to loosen the ice pieces therein, a second means for rocking the grid in one direction relative to the tray to remove loosened ice pieces from one side of the tray, a third means for rocking the grid in the opposite direction to remove loosened ice pieces from the other side of the tray, a prime mover, and mechanism driven by the prime mover and connected to operate the first, second and third means in sequence.

11. An ice making machine comprising a cooling element, a tray mounted in heat exchange relation to the cooling element for freezing liquid therein and having an arcuate bottom wall, a grid in said tray having a longitudinal wall and transverse walls mounted to rock on the longitudinal wall, a member movable longitudinally of the tray and connected to rock the transverse walls successively to loosen the ice pieces in the tray, a rotatable element, means for connecting the member and element to rock the grid in one direction to remove the loosened ice pieces from one side of the tray, a reversing means, means for connecting the member and reversing means to rock the grid in the opposite direction to remove loosened ice pieces from the other side of the tray, a prime mover, and mechanism operated by the prime mover for actuating the movable member longitudinally to first connect it to the rotatable element and then connect it to the reversing means in sequence.

12. An ice making machine comprising a cooling element, a tray mounted in heat exchange relation to the cooling element for freezing liquid therein and having an arcuate bottom wall, a grid in said tray having a longitudinal wall and transverse walls movable relative to the longitudinal wall, a first means for moving the transverse walls of the grid to loosen the ice pieces therein, a second means for rocking the grid in one direction relative to the tray to remove loosened ice from one side of the tray, a third means for rocking the grid in the opposite direction to remove loosened ice from the other side of the tray, mechanism to operate the first, second and third means in sequence, power means mechanically connected to operate the mechanism and elements operated by the power means in timed relation to the rocking of the grid and having fingers movable between the transverse walls of the grid to eject ice pieces therefrom.

13. An ice making machine comprising a cooling element, a tray mounted in heat exchange relation to the cooling element for freezing liquid therein and having an arcuate bottom wall, a grid in said mold forming a plurality of individual cells and mounted to rock about the longitudinal axis of the arcuate wall, power driven mechansism connected to rock the grid first in one direction to remove ice from one side of the tray and then in the opposite direction to remove ice from the other side of the tray, and rotary shafts at opposite sides of the tray with fingers extending therefrom and operated by the power driven mechanism in timed relation to the rocking of the grid to eject ice pieces from opposite sides thereof.

*14. An automatic ice making machine of the type in which liquid is frozen into ice in repeated cycles as governed by a control means operable responsive to a condition related to the formation of ice comprising: a cooling element; an ice mold in heat exchange relation to said cooling element; a grid having a movable longitudinal wall and a plurality of movable transverse walls positioned in said mold for dividing said mold into sections; and actuating means connected to said grid for initiation by said control means to move said transverse walls relative to said mold to loosen ice pieces frozen in said sections and to move said longitudinal wall laterally of the mold to sweep the loosened pieces from said mold.*

*15. An automatic ice making machine of the type in which liquid is frozen into ice in repeated cycles as governed by a control means operable responsive to a condition related to the formation of ice comprising: a cooling element; an ice mold in heat exchange relation to*

*said cooling element; a grid having a movable longitudinal wall and a series of movable transverse walls positioned in said mold to form individual cells; and actuating means connected to said grid for initiation by said control means to move said series of transverse walls relative to said mold to loosen ice pieces frozen in said cells and to move said longitudinal wall relative to the mold to sweep the loosened pieces from said mold.*

*16. An automatic ice making machine of the type in which liquid is frozen into ice in repeated cycles as governed by a control means operable responsive to a condition related to the formation of ice comprising: a cooling element; an ice mold in heat exchange relation to said cooling element; a grid positioned in said mold to form individual ice shaping cells and having a movable longitudinal wall and a series of movable transverse walls along said longitudinal wall; and actuating means connected to said grid for initiation by said control means to move said series of transverse walls relative to said mold to loosen ice pieces frozen in said cells and to move said longitudinal wall to remove the loosened pieces from said mold.*

*17. An automatic ice making machine of the type in which liquid is frozen into ice in repeated cycles as governed by a control means operable responsive to a condition related to the formation of ice comprising: a cooling element; an ice mold having an arcuate bottom wall in heat exchange relation to said cooling element; a grid having a movable longitudinal wall and a series of movable transverse walls positioned in said mold to form individual cells; and actuating means connected to said grid for initiation by said control means, said series of transverse walls being adapted for movement by said actuating means relative to said mold to loosen ice pieces frozen in said cells and said longitudinal wall being mounted to thereafter move about the longitudinal axis of the arcuate bottom wall of the mold to sweep the loosened pieces from said mold.*

*18. An automatic ice making machine of the type in which liquid is frozen into ice in repeated cycles as governed by a control means operable responsive to a condition related to the formation of ice comprising: a cooling element; an ice mold having an arcuate bottom wall in heat exchange relation to said cooling element; a grid positioned in said mold to form individual ice shaping cells and having a movable longitudinal wall and a series of movable transverse walls along said longitudinal wall; and actuating means connected to said grid for initiation by the control means, said series of parallel transverse walls being adapted for movement by said actuating means relative to each other and to said mold to loosen ice pieces frozen in said cells and said longitudinal wall being mounted to thereafter move in one direction about the longitudinal axis of the arcuate bottom wall of the mold to sweep the loosened pieces from one side of said mold and then move in the opposite direction to sweep the loosened pieces from the other side of the mold.*

*19. An automatic ice maker in which liquid is frozen into ice in repeated cycles as governed by a control means operable responsive to a condition related to the formation of ice comprising: a cooling element; an ice mold in heat exchange relation to said cooling element; means positioned in said mold to form individual ice shaping cells and having a series of transverse walls movable relative to said mold to loosen ice pieces frozen in said cells; actuating means connected to said transverse walls to move said series of transverse walls relative to said mold to loosen ice pieces frozen in said cells; and means also actuated by said actuating means for thereafter removing the loosened pieces from the mold.*

References Cited in the file of this patent or the original patent

UNITED STATES PATENTS

| | | |
|---|---|---|
| 1,868,503 | Kennedy | July 26, 1932 |
| 2,161,321 | Smith | June 6, 1939 |
| 2,202,734 | Jacobs | May 28, 1940 |
| 2,221,694 | Potter | Nov. 12, 1940 |
| 2,259,066 | Gaston | Oct. 14, 1941 |
| 2,364,559 | Storer | Dec. 5, 1944 |
| 2,435,802 | Smith | Feb. 10, 1948 |
| 2,492,583 | Knupp | Dec. 27, 1949 |
| 2,509,000 | Hobson | May 23, 1950 |
| 2,515,457 | Lutz | July 18, 1950 |
| 2,516,257 | Sampson | July 25, 1950 |
| 2,522,651 | Van Vleck | Sept. 19, 1950 |
| 2,546,769 | Moore | Mar. 27, 1951 |
| 2,576,591 | Geyer | Nov. 27, 1951 |
| 2,599,972 | Buchanan | June 10, 1952 |
| 2,701,453 | Henderson | Feb. 8, 1955 |